(12) United States Patent
Zhu et al.

(10) Patent No.: US 11,435,261 B2
(45) Date of Patent: Sep. 6, 2022

(54) METHOD FOR ANALYZING TOLERANCE DISTRIBUTIONS IN A FREEFORM SURFACE MIRROR OF AN OPTICAL SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Xiao-Fei Wu, Beijing (CN); Yu-Ting Deng, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 1127 days.

(21) Appl. No.: 16/003,015

(22) Filed: Jun. 7, 2018

(65) Prior Publication Data

US 2019/0049334 A1    Feb. 14, 2019

(30) Foreign Application Priority Data

Aug. 14, 2017   (CN) .......................... 201710692784.2

(51) Int. Cl.
*G01M 11/00*    (2006.01)
*G02B 27/00*    (2006.01)

(52) U.S. Cl.
CPC ....... *G01M 11/005* (2013.01); *G02B 27/0012* (2013.01)

(58) Field of Classification Search
CPC .................. G01M 11/005; G02B 27/0012
See application file for complete search history.

(56) References Cited

U.S. PATENT DOCUMENTS 6,963,824 B1 * 11/2005 Davidson ................ G06F 30/00
                                                    703/2

* cited by examiner

*Primary Examiner* — Michael A Lyons
*Assistant Examiner* — Amanda Merlino
(74) *Attorney, Agent, or Firm* — ScienBiziP, P.C.

(57) ABSTRACT

A method for analyzing distribution of tolerances on a freeform surface in an optical system. Establishes a freeform surface imaging optical system. A plurality of fields is selected, and maximum and minimum margins of wavefront errors in each field are defined. One freeform surface in one field is selected, an isolated point jumping model is established, and an isolated point is placed in different areas of the freeform surface of the one field. A local figure error with extreme values corresponding to each field is resolved, based on the maximum and minimum margins of wavefront errors, and the local surface tolerance distributions of the freeform surface in the plurality of fields are integrated together.

18 Claims, 11 Drawing Sheets

METHOD FOR ANALYZING TOLERANCE DISTRIBUTIONS IN A FREEFORM SURFACE MIRROR OF AN OPTICAL SYSTEM

CROSS-REFERENCE TO RELATED APPLICATIONS

This application claims all benefits accruing under 35 U.S.C. § 119 from China Patent Application No. 201710692784.2, field on Aug. 14, 2017 in the China Intellectual Property Office, disclosure of which is incorporated herein by reference.

FIELD

The subject matter herein generally relates to measurement of tolerances in optical systems.

BACKGROUND

Compared with spherical and aspherical surfaces, the surface features of freeform surfaces are complex, and the processing methods of the freeform surfaces can leave complicated and various figure errors. Furthermore, freeform surfaces have larger processing difficulty and higher processing costs. Tolerance analysis is an essential part in an optical system design process. Tolerance analysis can provide an effective guidance for the manufacturing and assembling adjusting of optical systems, and thus the obtained optical system would meet design requirements.

However, conventional methods for analyzing tolerance distribution of freeform surface can only propose a global surface tolerance requirement, and do not consider the differences in surface tolerance requirements for different areas of freeform surfaces. Moreover, the global surface tolerance requirement can be tight for some areas of the freeform surface, which adds unnecessary processing operations and processing costs.

BRIEF DESCRIPTION OF THE DRAWINGS

Implementations of the present technology will now be described, by way of example only, with reference to the attached figures, wherein.

DETAILED DESCRIPTION

Figure 1:
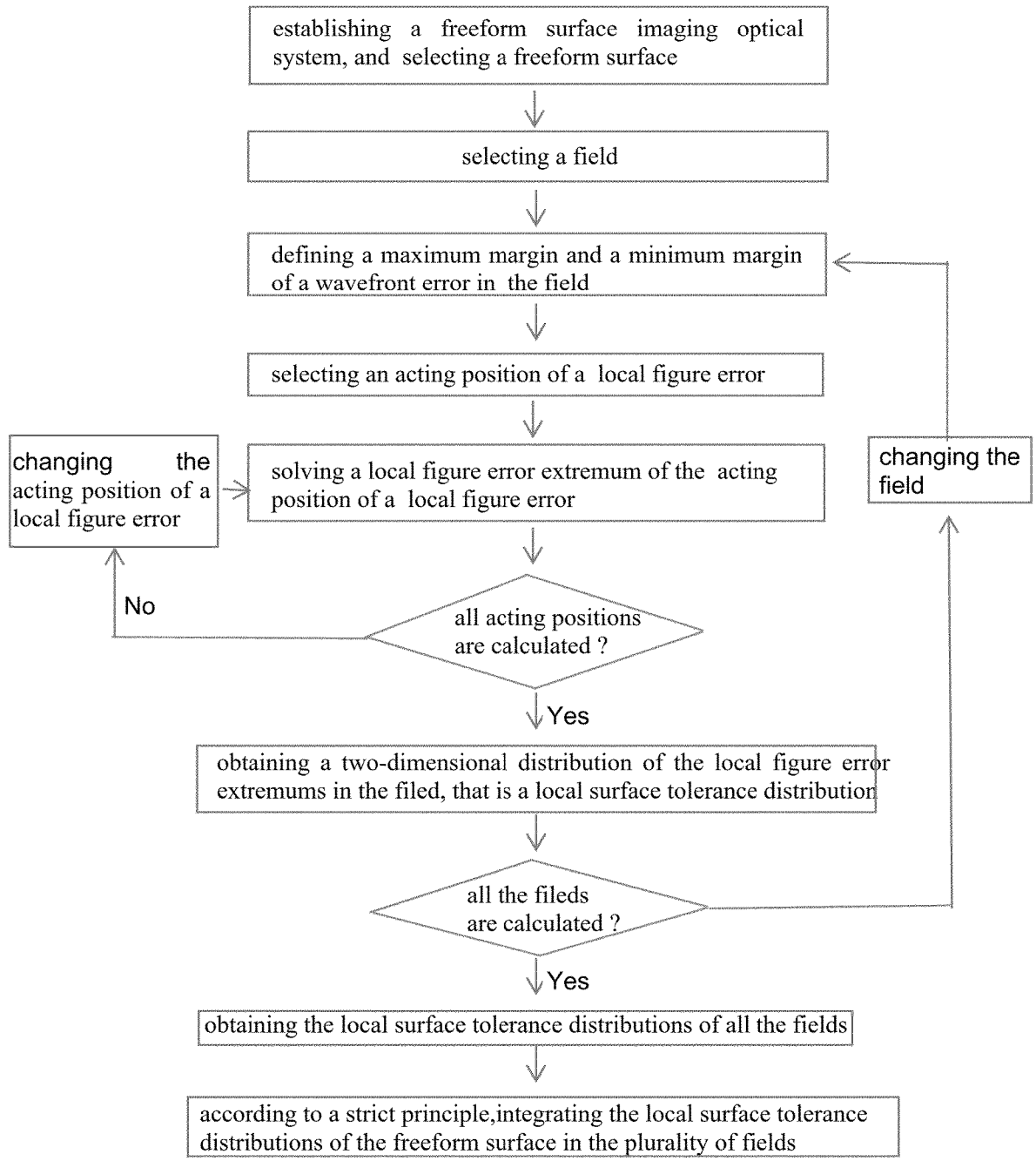
FIG. 1 is a flow diagram of an embodiment of a method for analyzing tolerance distributions in a freeform surface mirror of an optical system.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be that while essentially conforming to the particular dimension, shape, or other feature that is described, the component is not or need not be exactly conforming to the description. The term "comprising," when utilized, means "including, but not necessarily limited to"; it specifically indicates open-ended inclusion or membership in the so-described combination, group, series, and the like.

Freeform surface has locality, and different localities of the freeform surface have different properties. The locality of the freeform surface is reflected in the following three aspects. First, a shape of the freeform surface is very complicated. Different localities of the freeform surface have different local curvatures, and local curvature differences are obvious. That is, the surface features of the freeform surface have locality. Second, due to the local curvature differences, different localities of the freeform surface show different convergence capabilities for an incident light beam. That is, a focal power of the freeform surface has locality. Third, different areas of the freeform surface have different processing accuracies because of the processing methods of freeform surfaces, thus different areas remain different figure errors. That is, the figure tolerance of the freeform surface have locality.

Referring to FIG. 1, different localities of the freeform surface have different tolerance requirements, and a method for analyzing tolerance distribution in a freeform surface mirror of an optical system, of one embodiment, is provided. The method is implemented by a computer processor. The method comprises the following steps:

step (S10), establishing a freeform surface imaging optical system;

step (S11), selecting a plurality of fields in a range of fields of the freeform surface imaging optical system, defining a maximum margin and a minimum margin of a wavefront error in each of the plurality of fields, and selecting a freeform surface mirror in the freeform surface imaging optical system;

step (S12), establishing an isolated point jumping model, and sequentially applying an isolated point to different areas of the freeform surface mirror in each of the plurality of fields;

step (S13), reverse solving a local figure error extremum corresponding to each of the plurality of fields based on the maximum margin and the minimum margin; and step (S14), integrating the local surface tolerance distributions of the freeform surface mirror in the plurality of fields, to obtain a surface tolerance distribution of the freeform surface mirror.

In the starting step (S10), the freeform surface imaging optical system comprises at least one freeform surface mirror. A structure of the freeform surface imaging optical system is not limited to anything particular.

In step (S11), the freeform surface mirror can be any freeform surface mirror in the freeform surface imaging optical system. Other freeform surface mirrors excepting the freeform surface mirror in the freeform surface imaging optical system are considered as ideal surfaces. In one embodiment, the range of fields of the freeform surface imaging optical system is from about −7.5° to about −16.5°, and three fields, namely −7.5°, −9°, and −16.5°, are selected.

Figure 2:
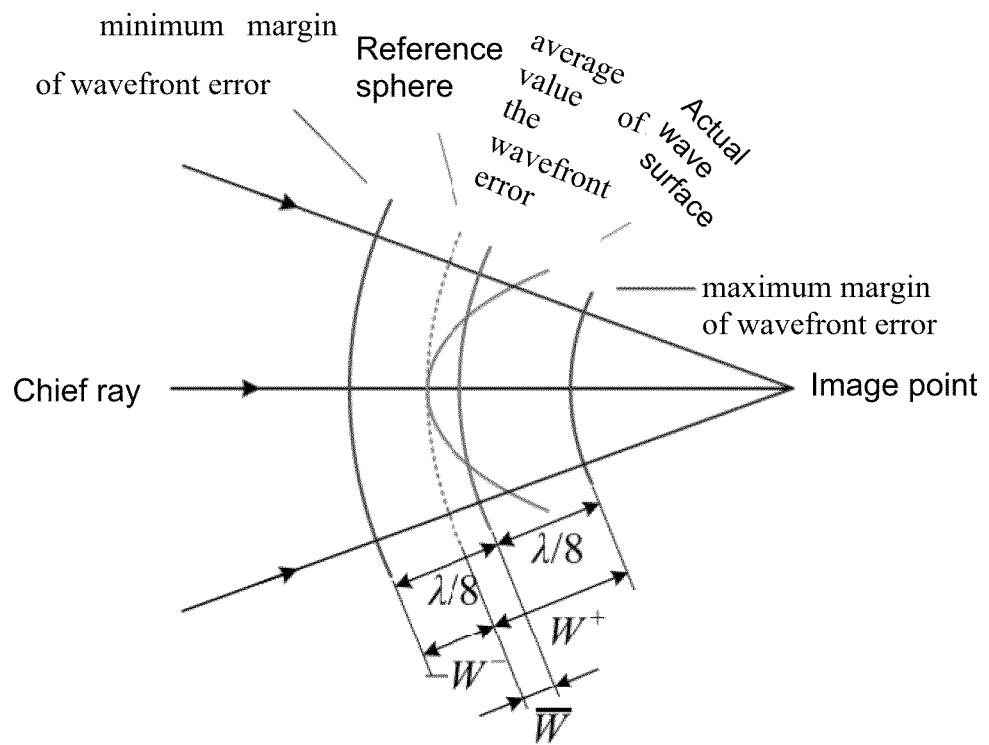
FIG. 2 shows a schematic view of a minimum margin and a maximum margin of wavefront error in the method in FIG. 1.

The incident light beam in each of the plurality of fields is reflected from the freeform surface and imaged. In one embodiment, wavefront error is selected as an index to describe an imaging quality. According to the Rayleigh criterion, setting a value (PV) of worst tolerance of the wavefront error as one quarter of wavelength, the value (PV) of worst tolerance is a difference between the maximum margin and the minimum margin of the wavefront error. One PV value can correspond to unlimited combinations of the maximum and minimum margins. The closer a first absolute value of the maximum margin is to a second absolute value of the minimum margin, the better. Referring to FIG. 2, in one embodiment, an average value of the wavefront error W is used as a reference. A first expression of the maximum margin of wavefront error is $$W^+ = \overline{W} + \frac{1}{8}\lambda,$$

wherein $W^+$ is positive. A second expression of the minimum margin of wavefront error is $$W^- = \overline{W} - \frac{1}{8}\lambda,$$

wherein $W^-$ is negative, wherein $\lambda$ represents wavelength, and $\overline{W}$ represents the average value of the wavefront error of all rays in an undisturbed initial system.

Since the average value of wavefront errors in different fields is different, the maximum and minimum margins for different fields are also different. If the wavefront error of all rays is between the maximum and minimum margins, the wavefront error PV value is set to be less than or equal to ¼ wavelength.

Figure 3:
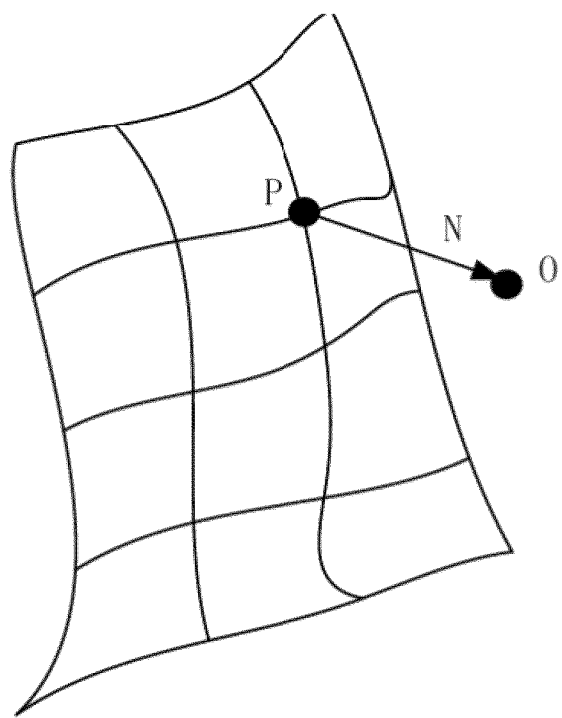
FIG. 3 shows a schematic view of one embodiment of an isolated point jumping model.

In step (S12), in one embodiment, the isolated point jumping model is established to simulate and impose local figure errors. An isolated point on the freeform surface is selected and the isolated point is jumped out of the freeform surface. A position a the isolated point represents a point a action of the local figure error. A jumping distance of the isolated point represents a value of the local figure error. Referring to FIG. 3, a method for solving the local figure error extremum corresponding to each field based on the isolated point jumping model comprises:

step (S20), selecting an isolated point P on the freeform surface in one of the plurality of fields;

step (S21), making the isolated point P jump to an isolated point O along a surface normal at the isolated point P; and step (S22), calculating a distance between the isolated point P and the isolated point O, wherein the distance between the isolated point P and the isolated point O is defined as d, and d is a local figure error extremum at the isolated point P.

In step (S20), the isolated point P is located within an effective distribution of the imaging beams on the freeform surface. In one embodiment, the freeform surface is divided into a plurality of meshes, and an edge point of the mesh is selected as the isolated point P.

In step (S21), applying a disturbance to the freeform surface mirror to produce a figure error. During the disturbance, except for the isolated point P, the surfaces of other local areas of the freeform surface mirror are not affected by the disturbance. In one embodiment, the freeform surface mirror produces a low-frequency and gradually-varying figure error by the application of the disturbance.

After the isolated point P jumps to the isolated point O, the isolated point P is still considered as a non-contiguous part of the freeform surface mirror. The surface normal vector at the isolated point P is assumed to be unchanged. A basis for making this assumption is as follows. The main effect of the low-frequency and gradually-varying figure error is to change coordinates of each point on a surface. That is, each isolated point on the surface has a different degree of jump, however it has little effect on the normal vector at each isolated point on the surface, and a normal deviation has little effect on the imaging quality of an optical system. Therefore, the normal deviation can be ignored, the low-frequency and gradually-varying figure error only causes the coordinates of each isolated point on the surface to change without affecting its normal vector.

In step (S22), the local figure error extremum at the isolated point P is the jumping distance produced by the isolated point P jumping to the isolated point O.

In step (S23), when the local figure error extremum values are applied to different local positions on the freeform surface mirror, the wavefront error of the freeform surface imaging optical system is equal to the maximum and minimum margins of the wavefront error. The local figure error extremum value corresponding to the maximum margin of the wavefront error is defined as a positive extremum value. The local figure error extremum value corresponding to the minimum margin of the wavefront error is defined as a negative extremum value.

Figure 4:
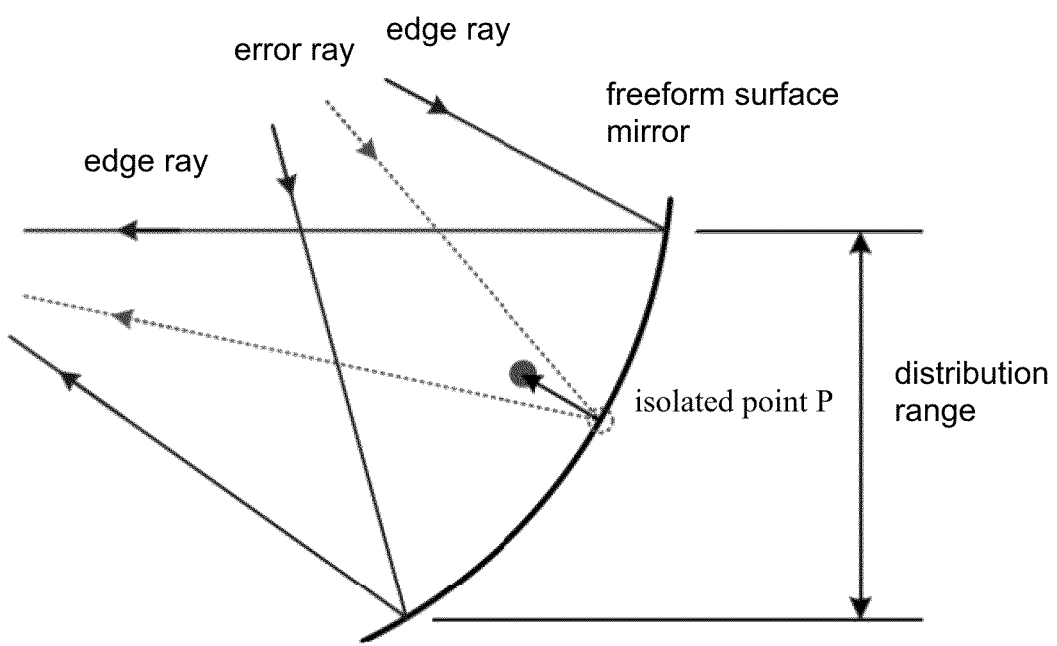
FIG. 4 is a light path schematic view of an embodiment of an error ray passing through an isolated point P.

Referring to FIG. 4, the isolated point P is located on a freeform surface mirror adjacent to an image plane without loss of generality. The disturbance is applied to the isolated point P on the local area of the freeform surface mirror, and the isolated point P jumps out of the freeform surface mirror. The jumping out of the isolated point P only affects a ray passing through the isolated point P in the one of the plurality of fields; such ray being defined as "error ray".

Figure 5:
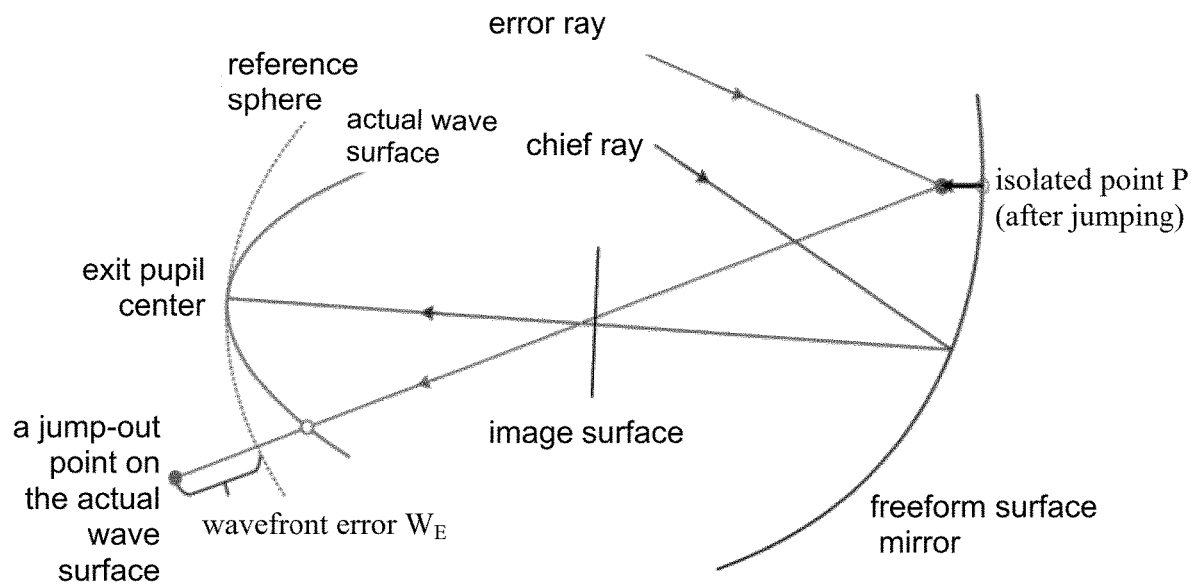
FIG. 5 is a schematic view of a wavefront error calculation model of the error ray in FIG. 4.

A wavefront error calculation model of the error ray is established. Referring to FIG. 5, because of the jumping out of the isolated point P, an equal phase point after experiencing a same optical path of the error ray jumps out of an actual wave surface, obtains an isolated jump-out point. According to a definition of wavefront error, an optical path difference between an actual wave surface and a reference sphere is the wavefront error of the error ray. The wavefront error of the error ray is defined as $W_E$, and a value of $W_E$ is positive.

Figure 6:
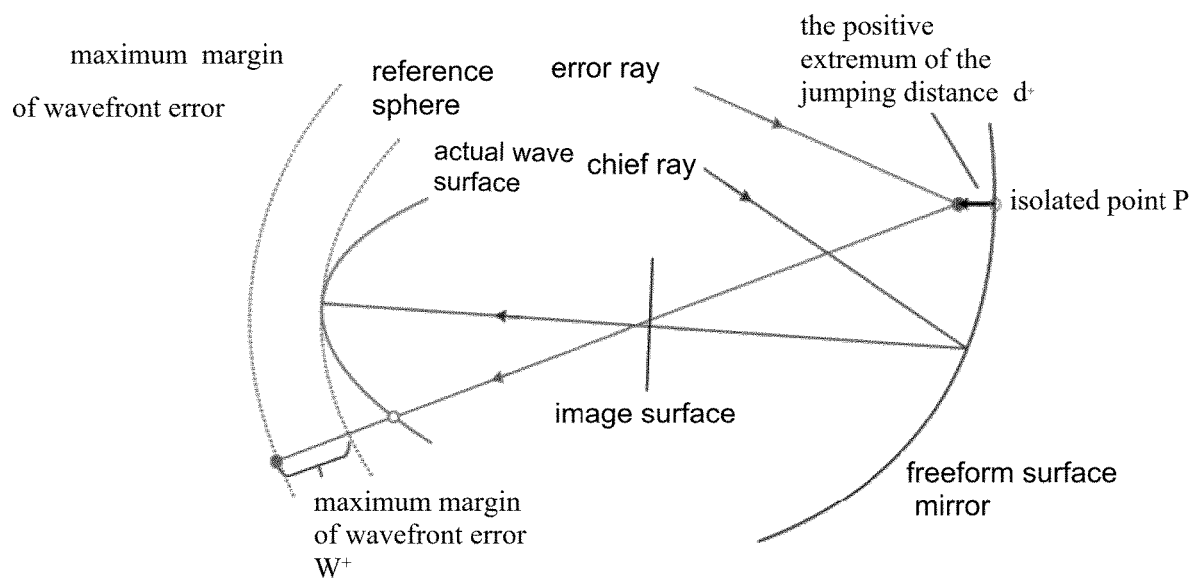
FIG. 6 is a calculation model schematic view of an embodiment of a jumping distance of the isolated point P.

Referring to FIG. 6, when the wavefront error of the error ray is the maximum margin of the wavefront error, a positive extremum of the isolated point P can be obtained by reverse solving, the positive extremum of the isolated point P being defined as $d^+$. When the wavefront error of the error ray is the minimum margin of the wavefront error, a negative extremum of the isolated point P can be obtained by reverse solving, the negative extremum of the isolated point P being defined as $d^-$. First, the two boundary values $d_1$, $d_2$ are given, based on a monotonous relationship between the jumping distance of the isolated point P and the wavefront error of the error ray, the wavefront error $W_{E1}$ corresponding to $d_1$ and the wavefront errors $W_{E2}$ corresponding to $d_2$ can be obtained. If the $W_{E1}$, $W_{E2}$ are not equal to $W^+$ and $W^-$, repeated iterations can be carried out based on a mathematical dichotomy, and $d^+$ and $d^-$ of the jumping distance of the isolated point P can be obtained by reverse solving. Therefore, the figure error extremum at the isolated point P of the freeform surface in this field can be obtained. The positive extremum and the negative extremum define an allowable range of the local figure error. The local figure error should be between the positive and negative extremums. Otherwise, the wavefront error of the error ray will exceed the maximum margin or the minimum margin of the wavefront error and affect the imaging quality of the system.

After the figure error extremum at the isolated point P of the freeform surface mirror in the one of the plurality of fields is obtained, a position of the disturbance applied on the freeform surface mirror in one of the plurality of fields is constantly changed. That is, a plurality of isolated points are selected to obtain the local figure error extremums at the plurality of isolated points. Therefore, the local surface tolerance distribution of the freeform surface mirror in the one of the plurality of fields can be obtained. The local surface tolerance distribution is a two-dimensional distribution of the local figure error extremums on the freeform surface mirror. The two-dimensional distribution reflects a distribution of the allowable range of figure errors on the freeform surface mirror. The surface tolerance distribution comprises positive and negative distributions. The positive distribution reflects a distribution of an allowable range of a positive figure error on the freeform surface mirror. The negative distribution reflects a distribution of an allowable range of a negative figure error on the freeform surface mirror.

Figure 7:
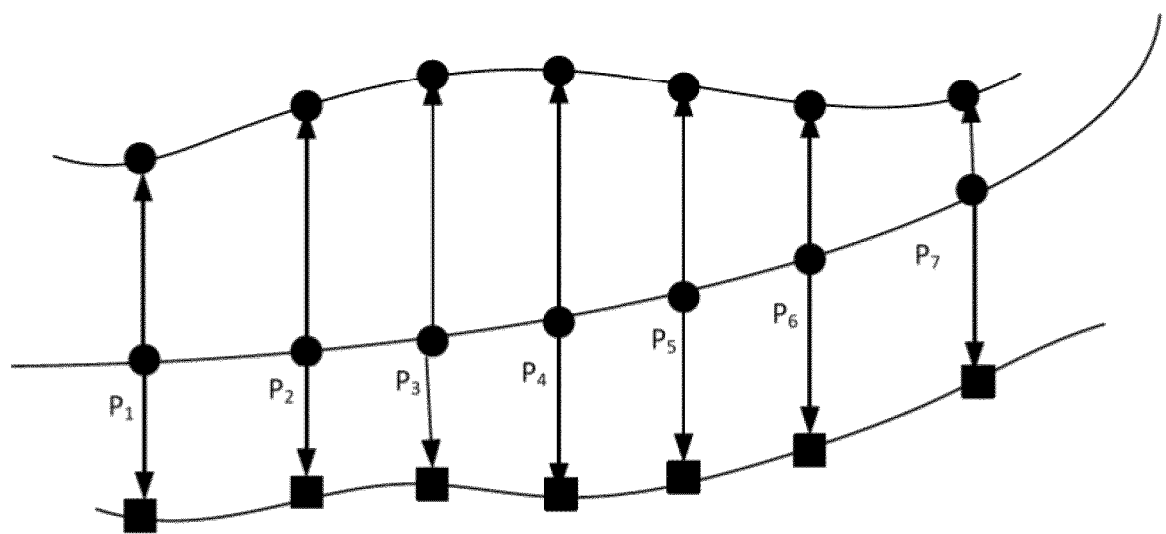
FIG. 7 is a two-dimensional distribution schematic view of an embodiment of an extreme value of a local figure error on a freeform surface.

FIG. 7 shows a two-dimensional distribution of the local figure error extremums on the freeform surface, wherein $P_1$-$P_7$ represent seven isolated points at different positions of the freeform surface. Seven circular points and seven square points corresponding to the seven isolated points are shown. Each circular point represents a positive extremum of a jump distance of each isolated point, and each square point represents a negative extremum of the jump distance of each isolated point. On the whole, the seven circular points describe the positive distribution of the local figure error extremums on the local freeform surface, and the seven square points describe the negative distribution of the local figure error extremums on the local freeform surface. It can be seen that a positive tolerance requirement near point $P_7$ is strict, and a positive tolerance requirement near point $P_3$ is far less strict. A negative tolerance requirement near $P_2$ is strict, and a negative tolerance requirement near $P_5$ is far less strict.

After solving a local surface tolerance distribution of the freeform surface mirror in one of the plurality of fields, the same method as above is used to solve the local surface tolerance distribution of the freeform surface in other fields.

In step (S14), the local surface tolerance distributions of the freeform surface in the plurality of fields are independent of each other. That is, the surface tolerance distribution in a certain field is only meaningful for the field itself and has no significance for other fields. Guiding the machining of a freeform surface with the surface tolerance distribution of one particular field does not consider the imaging quality of other fields is one-sided. Therefore, the surface tolerance distributions of the freeform surface mirror in the plurality of fields should be integrated to obtain a comprehensive result as a final distribution of surface tolerances. The surface tolerance distribution only defines an effective distribution range of the imaging beam on the freeform surface; outside the effective distribution range, the figure error does do not have any effect on the imaging, and the values of surface tolerances can be regarded as infinite.

Figure 8:
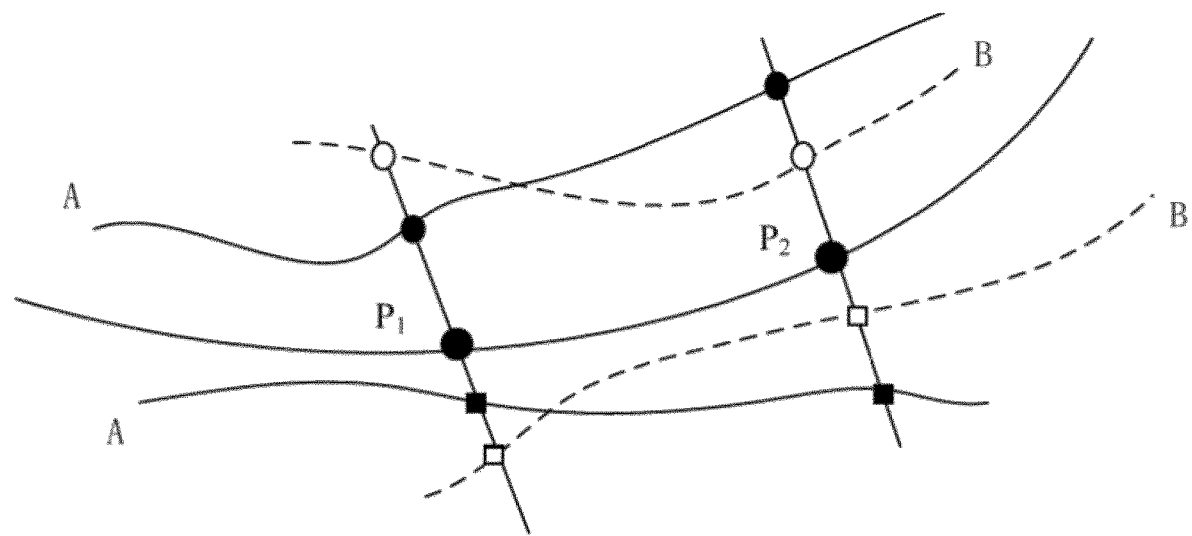
FIG. 8 is a schematic view of an embodiment of the surface tolerance distributions of fields A and B.

Since the distribution ranges of the imaging beams on the freeform surface of different fields generally do not overlap, surface tolerance distributions of different fields have different definition domains. FIG. 8 shows the surface tolerance distributions of fields A and B. $P_1$ and $P_2$ represent two isolated points on freeform surface. Solid circular point represents a positive extremum of a jump distance corresponding to field A, and solid square point represents a negative extremum of the jump distance corresponding to field A. Hollow circular point represents a positive extremum of a jump distance corresponding to field B, and hollow square point represents a negative extremum of the jump distance corresponding to field B. The solid lines show the surface tolerance distribution of field A. The dotted lines show the surface tolerance distribution of field B.

Figure 9:
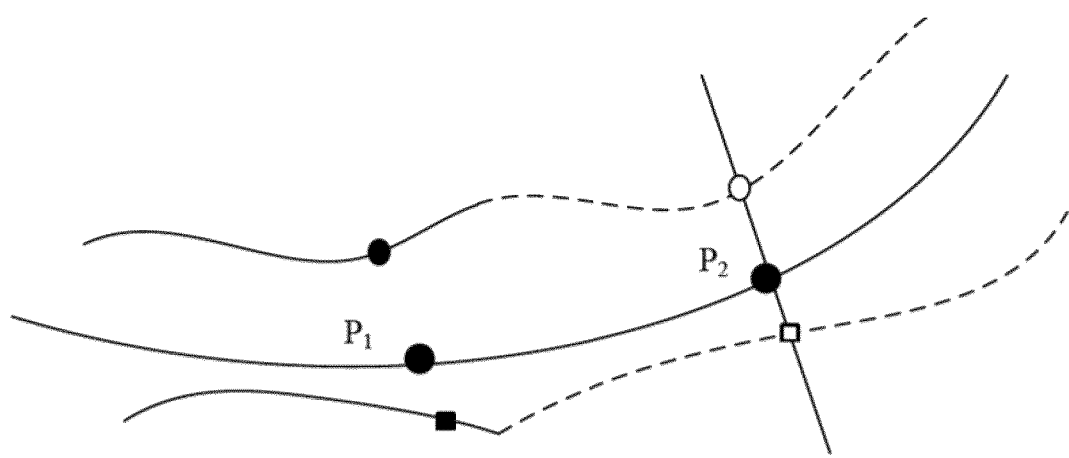
FIG. 9 is a schematic view of the integration results of the surface tolerance distributions of fields A and B in FIG. 8.

FIG. 9 shows results of the integration of the surface tolerance distributions of fields A and B from FIG. 8. A method for integrating the freeform surface tolerance distributions of the plurality of fields comprises selecting a smallest positive extremum as a comprehensive positive extremum and a negative extremum with a smallest absolute value as a comprehensive negative extremum according to a strict principle, and finally the surface tolerance distribution of the freeform surface after integration is obtained. A definition domain of the surface tolerance distributions after integration is a union of the definition domains of the surface tolerance distributions in the plurality of fields. That is, the definition domain of the surface tolerance distribution after integration is a sum of the distribution ranges of the imaging beams of each field on the freeform surface.

In one embodiment, the optical system comprises only one freeform surface mirror. After the surface tolerance distribution of the freeform surface mirror is obtained, further manufacturing of the freeform surface mirror according to the surface tolerance distribution will achieve the optical system itself. In another embodiment, the optical system comprises a plurality of freeform surface mirrors. After a surface tolerance distribution of each of the freeform surface mirrors is obtained, further manufacturing each of the freeform surface mirrors according to the surface tolerance distributions of each of the freeform surface mirrors will allow the optical system to be obtained.

Figure 10:
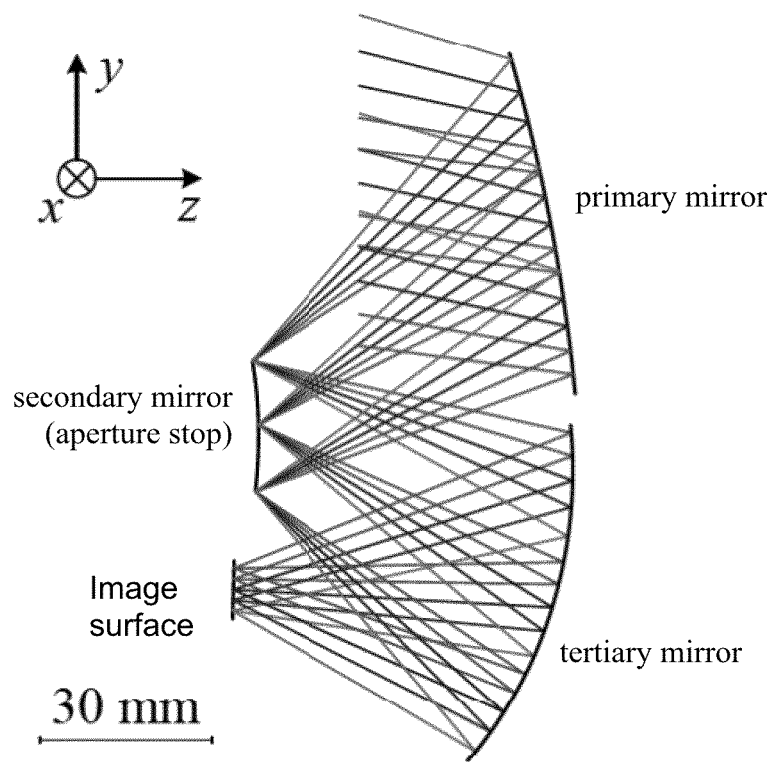
FIG. 10 is structure schematic view of an embodiment of an off-axis three-mirror system with freeform surfaces.

Referring to FIG. 10, an off-axis three-mirror system with freeform surfaces of one embodiment is provided. The off-axis three-mirror system with freeform surfaces comprises a primary mirror, a secondary mirror, and a tertiary mirror. The secondary mirror is an aperture stop. Each of the primary mirror, the secondary mirror, and the tertiary mirror is a freeform surface reflector. The off-axis three-mirror system with freeform surfaces has a line field of about 9° in a tangential direction, wherein a central field is about −12°, and a field range is from about −7.5° to about −16.5°. Some parameters of the off-axis three-mirror system with freeform surfaces are listed in TABLE 1.

TABLE 1

| parameters | index | remarks |
|---|---|---|
| pupil entrance diameter | 40 mm | — |
| field | 9° (line field in the tangential direction) | the central field is about −12° |
| focal length | 55.2 mm | — |
| F number | 1.38 | — |
| working wavelength | medium wave infrared | reference wavelength of 5 μm |

Figure 11:
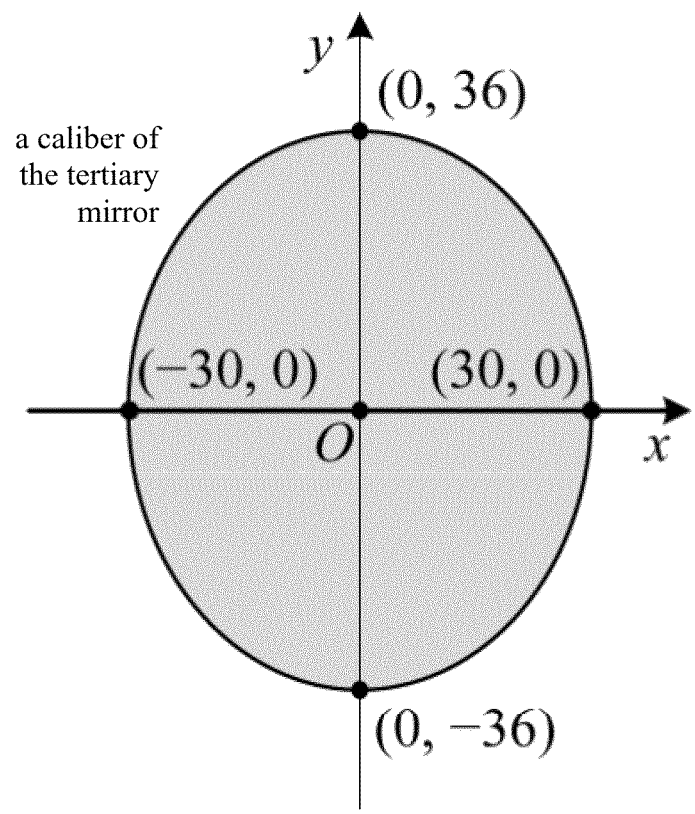
FIG. 11 is a coordinate schematic view of caliber parameters of a tertiary mirror of the off-axis three-mirror system with freeform surfaces in FIG. 10.

An imaging quality of the off-axis three-mirror system with freeform surfaces is excellent. The modulation transfer functions (MTF) of the off-axis three-mirror system with freeform surfaces are close to the diffraction limit. Referring to FIG. 11, the tertiary mirror is selected for analysis, a caliber of the tertiary mirror is oval, a length of a long axis is about 72 millimeters, and a length of a short axis is about 60 millimeters.

Within the field range from −7.5° to −16.5°, 49 fields are equally sampled at 0.1875° intervals. A reference sphere is established for each field of the 49 fields, and maximum and minimum margin of wavefront error are set for each field. A local surface tolerance distribution of the freeform surface in each field can be obtained using above method; and finally the 49 sampled fields are integrated, to obtain a surface tolerance distribution of the tertiary mirror. According to the positive and negative distributions of the surface tolerances of the tertiary mirror, different areas have different surface tolerance requirements. The positive and negative tolerances are also different. An edge area of the tertiary mirror is outside the distribution range of all field imaging beams, and a tolerance requirement for the edge area of the tertiary mirror can be considered as infinite.

A definition domain of the surface tolerance distribution of the tertiary mirror is a sum of the distribution ranges of the imaging beams in each field on the tertiary mirror. A range of the definition domain of the surface tolerance distribution of the tertiary mirror is slightly smaller than the caliber of the tertiary mirror. Within an allowable range of the surface tolerance distribution, a low-frequency and gradually-varying figure error is established and applied to the tertiary mirror. A PV value of the wavefront error is less than or equal to one quarter of wavelength, which meets the wavefront error tolerance requirements. The method for analysis of the primary mirror and the secondary mirror are the same as that for the tertiary mirror.

The method provided by the present discloser can reflect the surface tolerance requirements for different localities of the freeform surface, and indicate which localities have strict tolerance requirements and which areas may have less strict tolerances. Thus, machining personnel can apply different degrees of machining accuracy control to the surface area with different tolerance requirements. More specific performance in the path planning, tool attitude control, local polishing, and other processing elements are also required. Accuracy allocation of freeform surface machining will be guided, thereby reducing machining operations and processing costs.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for analyzing tolerance distribution in freeform surface mirror of optical system comprising:
   step (S10), establishing a freeform surface imaging optical system;
   step (S11), selecting a plurality of fields in a range of fields of the freeform surface imaging optical system, defining a maximum margin and a minimum margin of a wavefront error in each of the plurality of fields; and selecting a freeform surface mirror in the freeform surface imaging optical system;
   step (S12), establishing an isolated point jumping model, and sequentially applying an isolated point to different areas of the freeform surface mirror in each of the plurality of fields;
   step (S13), reverse solving a local figure error extremum corresponding to each of the plurality of fields based on the maximum margin and the minimum margin to obtain local surface tolerance distributions; and
   step (S14), integrating the local surface tolerance distributions of the freeform surface mirror in the plurality of fields, to obtain a surface tolerance distribution of the freeform surface mirror.

2. The method of claim 1, wherein an expression of the maximum margin is $$W^+ = \overline{W} + \frac{1}{8}\lambda,$$

wherein $W^+$ is positive, $\lambda$ represents wavelength, and $\overline{W}$ represents an average value of the wavefront error.

3. The method of claim 1, wherein an expression of the minimum margin is $$W^- = \overline{W} - \frac{1}{8}\lambda,$$

wherein $W^-$ is negative, $\lambda$ represents wavelength, and represents an average value of the wavefront error.

4. The method of claim 1, wherein when the wavefront errors of all rays are between the maximum margin and the minimum margin, a wavefront error value of each ray is set to be less than or equal to ¼ wavelength.

5. The method of claim 1, wherein the isolated point jumping model is established to simulate and apply a local figure error, a position of an isolated point represents a point of action of the local figure error, and a jumping distance of the isolated point represents a value of the local figure error.

6. The method of claim 1, wherein the local figure error extremum corresponding to each field is solved based on the isolated point jumping model, and a method for solving the extremum of the local figure error corresponding to each field based on the isolated point jumping model comprises:
step(S20), selecting an isolated point P on the freeform surface mirror in one of the plurality of fields;
step(S21), making the isolated point P jump to an isolated point O along a surface normal at the isolated point P; and
step(S22), calculating a distance between the isolated point P and the isolated point O, wherein the distance between the isolated point P and the isolated point O is defined as d, and d is a local figure error extremum at the isolated point P.

7. The method of claim 6, wherein the isolated point P is located within an effective distribution of an imaging beam on the freeform surface.

8. The method of claim 6, wherein the freeform surface mirror is divided into a plurality of meshes, and an edge point of the mesh is select as the isolated point P.

9. The method of claim 6, wherein in step (S21), applying a disturbance to the freeform surface mirror to produce a local figure error.

10. The method of claim 9, wherein during the disturbance, except for the isolated point P, other local areas of the freeform surface mirror are not affected by the disturbance.

11. The method of claim 9, wherein a jumping of the isolated point P only affects a ray passing through the isolated point P in the one of the plurality of fields, the ray is defined as "error ray".

12. The method of claim 11, wherein when the wavefront error of the error ray is the maximum margin of the wavefront error, a positive extremum of the isolated point P is obtained by reverse solving, and the positive extremum of the isolated point P is defined as $d^+$.

13. The method of claim 11, wherein when the wavefront error of the error ray is the minimum margin of the wavefront error, a negative extremum of the isolated point P is obtained by reverse solving, and the negative extremum of the isolated point P is defined as $d^-$.

14. The method of claim 13, wherein two boundary values $d_1$, $d_2$ are given, based on a monotonous relationship between the jumping distance of the isolated point P and the wavefront error of the error ray, the wavefront error $W_{E1}$ corresponding to $d_1$ and the wavefront errors $W_{E2}$ corresponding to $d_2$ are obtained.

15. The method of claim 13, wherein when the $W_{E1}$, $W_{E2}$ are not equal to $W^+$ or $W^-$, repeated iterations are carried on based on a mathematical dichotomy, and $d^+$ and $d^-$ of the jumping distance of the isolated point P are obtained by reverse solving.

16. The method of claim 6, wherein after the local figure error extremum at the isolated point P is obtained, constantly changing a position of a disturbance applied on the freeform surface mirror in the one of the plurality of fields to select a plurality of isolated points, solving the local figure error extremums at the plurality of isolated points to obtain the local surface tolerance distribution of the freeform surface in the one of the plurality of fields.

17. The method of claim 16, wherein the local surface tolerance distribution is a two-dimensional distribution of the local figure error extremums on the freeform surface mirror.

18. The method of claim 1, wherein a method for integrating the freeform surface tolerance distributions of the plurality of fields comprises: according to a strict principle, a smallest positive extremum is selected as a comprehensive positive extremum, a negative extremum with a smallest absolute value is selected as a comprehensive negative extremum, and finally, the surface tolerance distribution of the freeform surface after integrating is obtained.

* * * * *